US011106053B2

(12) United States Patent
Wong et al.

(10) Patent No.: US 11,106,053 B2
(45) Date of Patent: Aug. 31, 2021

(54) IMAGE GENERATION USING A SPINNING DISPLAY AND BLUR SCREEN

(71) Applicant: Disney Enterprises, Inc., Burbank, CA (US)

(72) Inventors: Clifford Wong, Burbank, CA (US); Nathan D. Nocon, Valencia, CA (US); Quinn Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 221 days.

(21) Appl. No.: 16/532,243

(22) Filed: Aug. 5, 2019

(65) Prior Publication Data

US 2021/0041710 A1 Feb. 11, 2021

(51) Int. Cl.
*G02B 30/54* (2020.01)
*G06F 1/16* (2006.01)
(Continued)

(52) U.S. Cl.
CPC ............. *G02B 30/54* (2020.01); *G02B 30/56* (2020.01); *G06F 1/1632* (2013.01); *H04B 1/3833* (2013.01)

(58) Field of Classification Search
CPC ............... G02B 27/0101; G02B 27/01; G02B 2027/0118; G02B 2027/0138;
(Continued)

(56) References Cited

U.S. PATENT DOCUMENTS

| 4,687,167 A | 8/1987 | Skalka et al. |
| 4,943,851 A | 7/1990 | Lang |

(Continued)

FOREIGN PATENT DOCUMENTS

| JP | S58-154913 U | 10/1983 |
| JP | H1-280992 A | 11/1989 |

(Continued)

OTHER PUBLICATIONS

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.

(Continued)

*Primary Examiner* — Ajibola A Akinyemi
(74) *Attorney, Agent, or Firm* — Farjami & Farjami LLP

(57) ABSTRACT

According to one implementation, an image generation system includes a rotor, a base including a motor for spinning the rotor about an axis of rotation, a display secured to the rotor, the display including a display surface, and a blur screen secured to the display. The blur screen has a vertical edge substantially parallel to the axis of rotation and includes a first light emission barrier, a second light emission barrier, and a horizontal gap having a width substantially perpendicular to the vertical edge separating the first light emission barrier from the second light emission barrier. The first light emission barrier and the second light emission barrier are configured to substantially prevent rotational blur of an image displayed by the display surface while the display and the blur screen are spun by the motor and the rotor.

18 Claims, 12 Drawing Sheets

(51) Int. Cl.
*G02B 30/56* (2020.01)
*H04B 1/3827* (2015.01)

(58) Field of Classification Search
CPC .............. G02B 27/0149; G02B 26/008; G02B 26/0833; G02B 2027/0123; G02B 2027/0134; G02B 2027/015; G02B 26/105; G02B 27/0179; G02B 30/56; G02B 2027/0109; G02B 2027/0136; G02B 2027/0154; G02B 2027/0159; G02B 2027/0161; G02B 2027/0181; G02B 2027/0187
USPC ........................................................ 359/478
See application file for complete search history.

(56) References Cited

U.S. PATENT DOCUMENTS

| | | | |
|---|---|---|---|
| 5,057,827 | A | 10/1991 | Nobile |
| 5,148,310 | A | 9/1992 | Batchko |
| 5,239,892 | A | 8/1993 | Sakai |
| 5,437,235 | A | 8/1995 | Randolph |
| 5,714,997 | A | 2/1998 | Anderson |
| 5,815,314 | A | 9/1998 | Sudo |
| 6,115,006 | A | 9/2000 | Brotz |
| 6,183,088 | B1 | 2/2001 | LoRe |
| 6,208,318 | B1 | 3/2001 | Anderson |
| 6,481,851 | B1 | 11/2002 | McNelley |
| 6,801,185 | B2 | 10/2004 | Salley |
| 6,886,281 | B2 | 5/2005 | Smith |
| 7,002,604 | B1 | 2/2006 | Barrus |
| 7,477,252 | B2 | 1/2009 | Chun |
| 7,490,941 | B2 | 2/2009 | Mintz |
| 7,587,120 | B2 | 9/2009 | Koo |
| 7,708,640 | B2 | 5/2010 | Burak |
| 8,233,032 | B2 | 7/2012 | Yukich |
| 8,698,966 | B2 | 4/2014 | Liu |
| 9,053,660 | B2 | 6/2015 | Liu |
| 9,186,595 | B1 | 11/2015 | Cannon |
| 10,310,284 | B1 | 6/2019 | Waldron |
| 2002/0148148 | A1 | 10/2002 | Smith |
| 2003/0142067 | A1 | 7/2003 | Kurtenbach |
| 2004/0082283 | A1 | 4/2004 | Lindell |
| 2004/0196362 | A1 | 10/2004 | Hoshino et al. |
| 2005/0035962 | A1 | 2/2005 | Ishibashi |
| 2005/0083570 | A1 | 4/2005 | Ueda |
| 2005/0284997 | A1 | 12/2005 | Tisbo |
| 2006/0171008 | A1 | 8/2006 | Mintz et al. |
| 2007/0139769 | A1 | 6/2007 | Decusatis et al. |
| 2007/0293299 | A1 | 12/2007 | Aida |
| 2008/0218854 | A1 | 9/2008 | Hoshino et al. |
| 2009/0312979 | A1 | 12/2009 | Pan |
| 2010/0007582 | A1 | 1/2010 | Zalewski |
| 2010/0195055 | A1 | 8/2010 | Maekawa |
| 2011/0199373 | A1 | 8/2011 | Liu |
| 2012/0146897 | A1 | 6/2012 | Yoshida et al. |
| 2012/0194419 | A1 | 8/2012 | Osterhout |
| 2012/0293941 | A1 | 11/2012 | Myerchin |
| 2013/0033650 | A1 | 2/2013 | Roberts |
| 2013/0050198 | A1 | 2/2013 | Song |
| 2013/0092805 | A1 | 4/2013 | Funk |
| 2013/0100126 | A1 | 4/2013 | Kim et al. |
| 2013/0100358 | A1 | 4/2013 | De Collibus |
| 2013/0343743 | A1 | 12/2013 | Yen |
| 2014/0091942 | A1 | 4/2014 | Matloff et al. |
| 2014/0118271 | A1 | 5/2014 | Lee |
| 2014/0307068 | A1 | 10/2014 | Song |
| 2015/0193084 | A1 | 7/2015 | Juni |
| 2015/0212718 | A1 | 7/2015 | Kellhammer |
| 2015/0288857 | A1 | 10/2015 | Fay et al. |
| 2017/0009935 | A1 | 1/2017 | Theis et al. |
| 2017/0023911 | A1* | 1/2017 | Russell ................ G03H 1/0005 |
| 2017/0038829 | A1 | 2/2017 | Lanier |
| 2017/0115488 | A1 | 4/2017 | Ambrus |
| 2017/0140791 | A1 | 5/2017 | Das et al. |
| 2017/0343804 | A1 | 11/2017 | Choi |
| 2018/0024373 | A1 | 1/2018 | Joseph |
| 2018/0224678 | A1 | 8/2018 | Jung |
| 2019/0156710 | A1 | 5/2019 | Hanson |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

Horimai, Hideyoshi, et al. "Full-Color 3D Display System with 360 Degree Horizontal Viewing Angle." *Proc. Int. Symposium of 3D and Contents*, 2010. pp. 1-4.

File History of Related U.S. Appl. No. 15/888,896, filed Feb. 5, 2018, and titled "Floating Image Display System."

File History of Related U.S. Appl. No. 15/985,477, filed May 21, 2018, and titled "Electrical Charger for a Spinning Device."

File History of Related U.S. Appl. No. 15/985,502, filed May 21, 2018, and titled "Display of a Floating Image with Depth Enhancement."

File History of Related U.S. Appl. No. 15/983,006, filed May 17, 2018, and titled "Multi-Perspective Display of an Image."

File History of Related U.S. Appl. No. 16/011,505, filed Jun. 18, 2018, and titled "Image Display System With Visual Flier."

File History of Related U.S. Appl. No. 16/002,947, filed Jun. 7, 2018, and titled "Image Generation System Including a Spinning Display."

File History of Related U.S. Appl. No. 16/197,198, filed Nov. 20, 2018, and titled "Communication System Generating a Floating Image of a Remote Venue."

File History of Related U.S. Appl. No. 16/224,717, filed Dec. 18, 2018, and titled "Stereoscopic Image Display System."

File History of Related U.S. Appl. No. 16/516,873, filed Jul. 19, 2019, and titled "Rotational Blur-Free Image Generation."

File History of Related U.S. Appl. No. 16/547,283, filed Aug. 21, 2019, and titled "Methods and Systems of Displaying an Image Free of Motion-Blur Using Spinning Projectors."

* cited by examiner

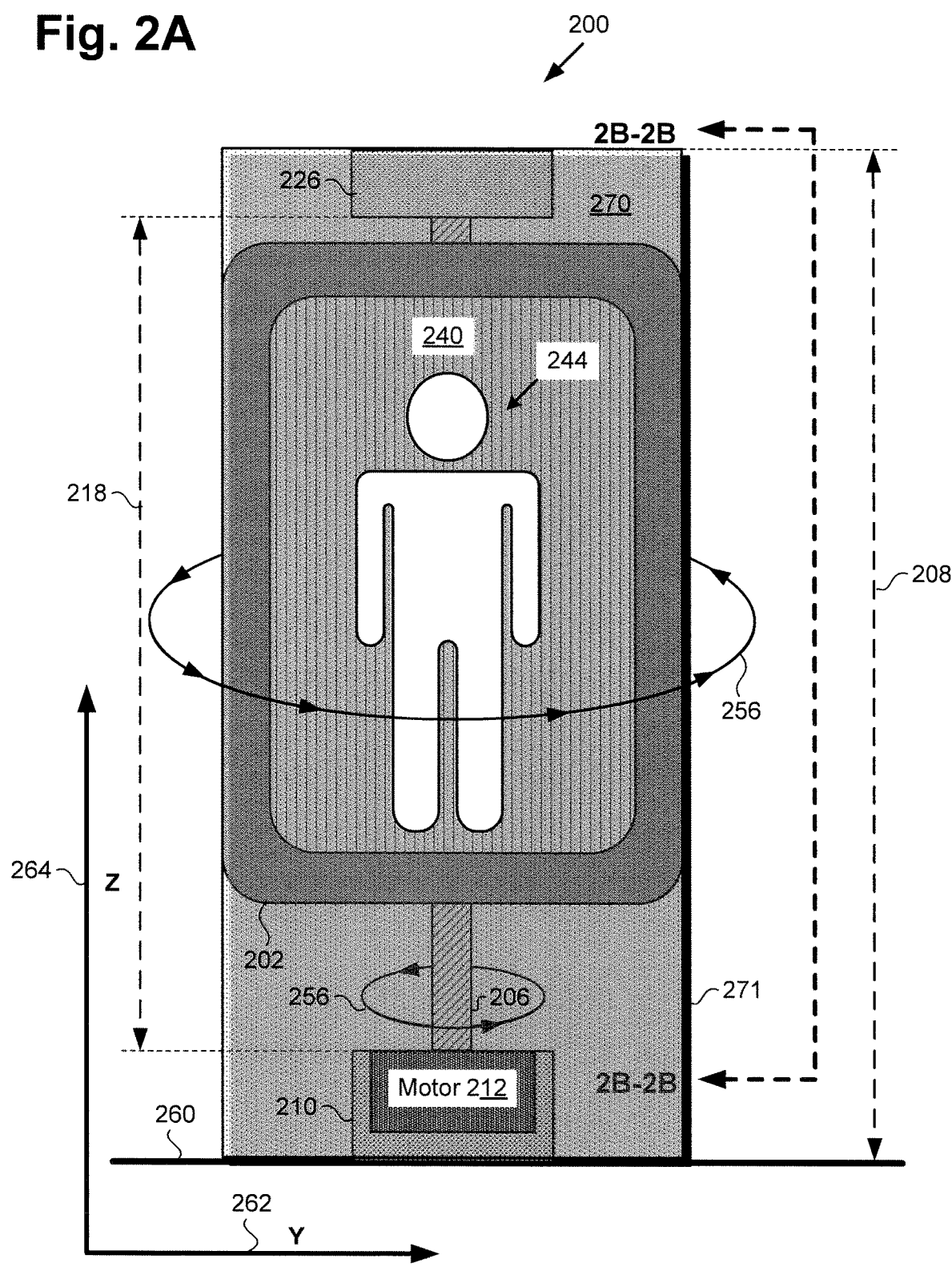

IMAGE GENERATION USING A SPINNING DISPLAY AND BLUR SCREEN

BACKGROUND

Increases in computing power have made possible the generation of richly featured virtual characters capable of simulating interactivity. The illusion of interactivity may be even greater when the virtual character appears to an observer to be independent of the image generation system producing it. For example, a spinning to display may be used to generate an apparently three-dimensional (3D) image that appears to float in space. However, blurring of the floating image due to rotation of the display used to produce it may be readily detectable to the eye of a human observer, and may undesirably reduce the immersiveness of the interactive experience for the observer.

SUMMARY

There are provided systems and methods for generating an image using a spinning display and blur screen, substantially as shown in and/or described in connection with at least one of the figures, and as set forth more completely in the claims.

BRIEF DESCRIPTION OF THE DRAWINGS

FIG. 2A shows a front view of an exemplary image generation system including a spinning display and blur screen corresponding in general to the system shown in FIG. 1, according to one implementation;

DETAILED DESCRIPTION

Figure 1:
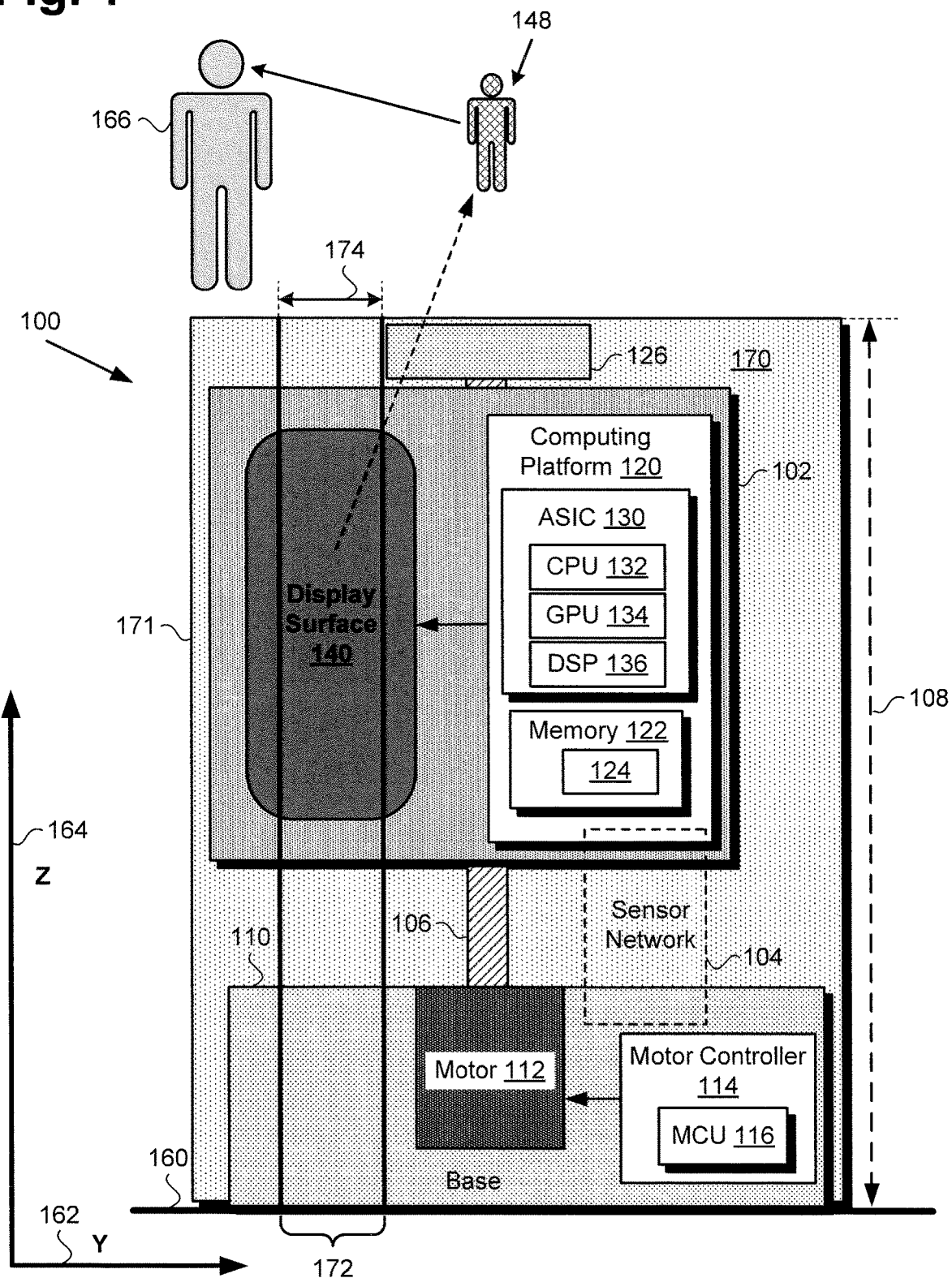
FIG. 1 shows a diagram of an exemplary image generation system including a spinning display and blur screen, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for generating an image that is substantially free of rotational blur using a spinning display and blur screen. FIG. 1 shows a diagram of exemplary image generation system 100, according to one implementation. As shown in FIG. 1, image generation system 100 includes bottom stationary base 110 including motor 112 and motor controller circuit 114 having motor control unit (MCU) 116, rotor 106, and top stationary endcap 126 opposite base 110. In addition, image generation system 100 includes display 102 secured to rotor 106 and situated between base 110 and endcap 126, as well as blur screen 170 with vertical edge 171 having height 108 and horizontal gap 172 having width 174 substantially perpendicular to vertical edge 171. It is noted that blur screen 170 may be secured to display 102 and/or rotor 106. It is further noted that display 102 and blur screen 170 are configured to spin about an axis of rotation of image generation system 100 (axis of rotation not shown in FIG. 1).

As further shown in FIG. 1, display 102 includes display surface 140 and computing platform 120 communicatively coupled to display surface 140 so as to control display surface 140. Computing platform 120 includes application specific integrated circuit (ASIC) 130 including central processing unit (CPU) 132 implemented as a hardware processor, graphics processing unit (GPU) 134 also implemented as a hardware processor, and may further include digital signal processor (DSP) 136. Computing platform 120 also includes system memory 122 implemented as a non-transitory storage device storing software code 124.

As also shown in FIG. 1, base 110 is situated on surface 160, which may be a floor or any other substantially horizontal surface. In addition, FIG. 1 shows horizontal axis 162 substantially parallel to surface 160 and designated herein as the "Y" axis, and vertical axis 164 substantially perpendicular to surface 160 and designated herein as the "Z" axis. It is noted that vertical axis 164 is substantially parallel to vertical edge 171 of blur screen 170. FIG. 1 further shows sensor network 104 bridging base 110 and display 102, and image 148 displayed by display surface 140, as well as observer 166 viewing image 148 through horizontal gap 172 of blur screen 170.

By way of definition, as used in the present application, the terms "render" and "rendering" are defined to mean causing one or more images to appear on a display surface, such as display surface 140. Thus, rendering an image may mean causing an entirely new image to appear on the display surface, or refreshing an image previously appearing on the display surface. Moreover, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 120, as well as a Control Unit (CU) for retrieving programs, such as software code 124, from system memory 122. A GPU is configured to reduce the processing overhead of the CPU by performing computationally intensive graphics processing tasks.

Sensor network 104 can include a base sensor unit integrated with base 110 and a rotating sensor unit integrated with display 102 and configured to rotate with display 102. According to one implementation, the base sensor unit may include one or more of an infrared (IR) light-emitting diode (LED), a magnet, a visible light LED, and a glyph or other visible marker, to name a few examples. The rotating sensor unit may include one or more of an IR receiver for sensing the IR LED, a Hall effect sensor for sensing the magnet, a photo diode for sensing the visible light LED, and one or more camera(s) for sensing the glyph or visible marker.

However, in another implementation, one or more of the IR LED, the magnet, the visible light LED, and the glyph or visible marker may be included in the rotating sensor unit, while one or more of the IR receiver, the Hall effect sensor, the photo diode, and the camera(s) may be included in the base sensor unit. It is noted that sensor network 104 may be utilized to track the rotational position and/or spin rate of display 102. Moreover, the combination of computing platform 120 of display 102, sensor network 104, and motor controller circuit 114 of base 110 enable the necessary time synchronization between the revolutions per minute (rpm) of motor 112 and rotor 106, and the frame rate in frames per second (fps) at which display 102 renders images. It is further noted that although FIG. 1 shows single observer 166, that representation is provided merely for conceptual clarity. More generally, observer 166 may correspond to a single observer, or to two or more observers.

FIG. 2A shows a front view of exemplary image generation system 200 including spinning display 202 and blur screen 270, according to one implementation. It is noted that the perspective depicted in FIG. 2A is shown as though seen through blur screen 270. As shown in FIG. 2A, in addition to display 202 and blur screen 270, image generation system 200 includes base 210 and endcap 226. Base 210 is shown to include motor 212 and to be situated on surface 260, which may be a floor or any other substantially horizontal surface. In addition, according to the exemplary implementation shown in FIG. 2A, image generation system 200 includes rotor 206 secured to display 202.

Display 202 includes display surface 240 on which two-dimensional (2D) graphic 244 is rendered. FIG. 2A further shows vertical edge 271 of blur screen 270 having height 208, and distance 218 between base 210 and endcap 226. Also shown in FIG. 2A are horizontal Y axis 262 substantially parallel to surface 260, vertical Z axis 264 substantially perpendicular to surface 260 and substantially parallel to vertical edge 271 of blur screen 270, and spin direction 256 of rotor 206, display 202, and blur screen 270.

Image generation system 200 corresponds in general to image generation system 100, in FIG. 1. As a result, image generation system 200 may share any of the characteristics attributed to image generation system 100 by the present disclosure, and vice versa. In addition, endcap 226, rotor 206, and base 210 including motor 212, correspond respectively in general to endcap 126, rotor 106, and base 110 including motor 112, in FIG. 1. Thus, endcap 226, rotor 206, base 210, and motor 212, may share any of the characteristics attributed to respective endcap 126, rotor 106, base 110, and motor 112, by the present disclosure, and vice versa. That is to say, although not explicitly shown in FIG. 2A, base 210 includes features corresponding respectively to motor controller circuit 114 and MCU 116.

Moreover, display 202 including display surface 240 corresponds in general to display 102 including display surface 140, in FIG. 1. Thus, display 202 and display surface 240 may share any of the characteristics attributed to respective display 102 and display surface 140 by the present disclosure, and vice versa. That is to say, although not explicitly identified in FIG. 2A, display 202 may include features corresponding respectively to computing platform 120 including ASIC 130 having CPU 132, GPU 134, and DSP 136, and further including system memory 122 storing software code 124.

It is noted that blur screen 270 with vertical edge 271 having height 208, in FIG. 2A, corresponds in general to blur screen 170 with vertical edge 171 having height 108, in FIG. 1. As a result, blur screen 270, vertical edge 271, and height 208 may share any of the characteristics attributed to respective blur screen 170, vertical edge 171, and height 108 by the present disclosure, and vice versa. Thus, like blur screen 170, blur screen 270 includes a feature corresponding to horizontal gap 172 having width 174 substantially perpendicular to vertical edge 171/271. Moreover, like blur screen 170, blur screen 270 may be secured to display 102/202 and/or rotor 106/206.

Figure 2B:
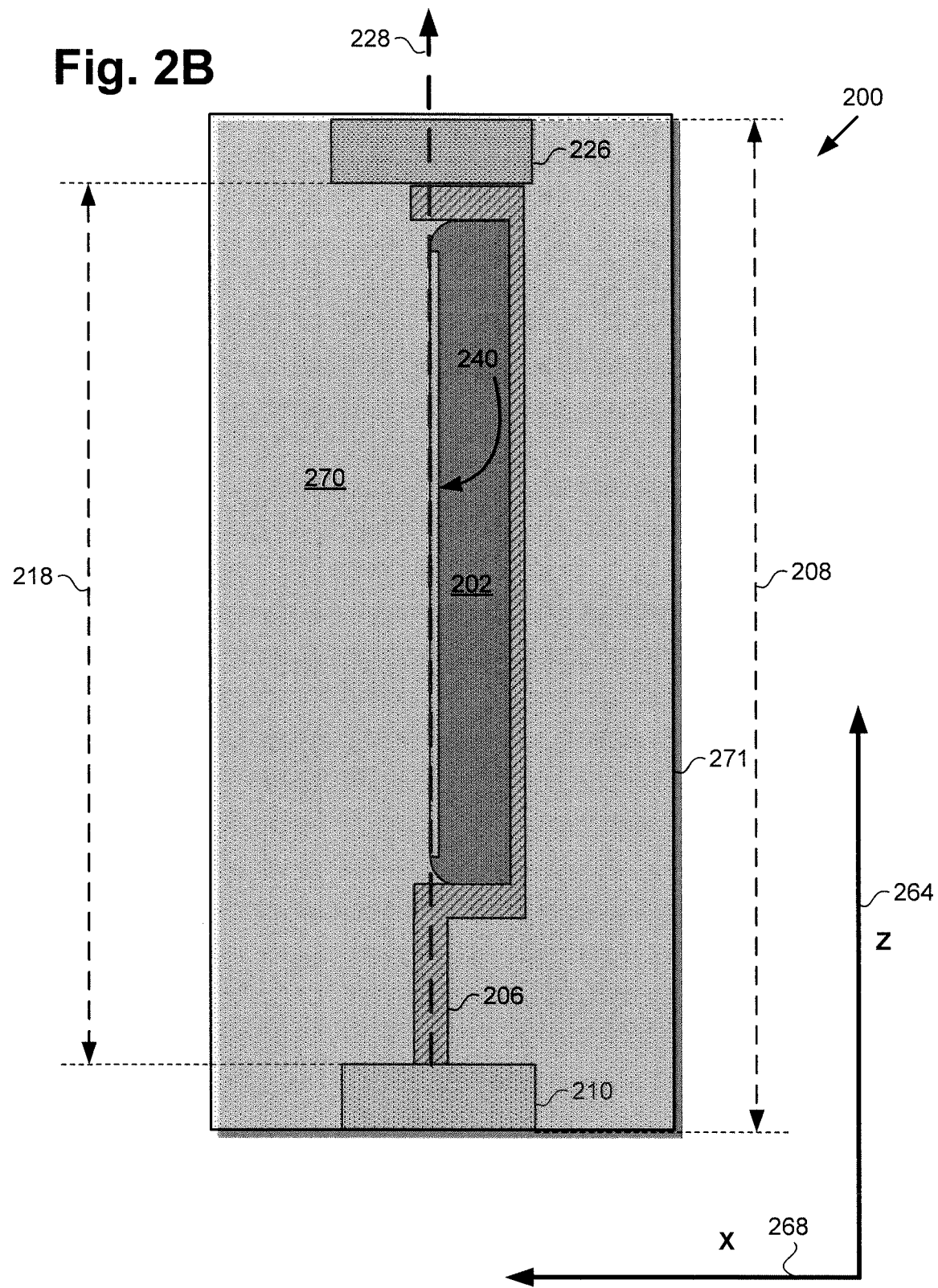
FIG. 2B shows a side view of the exemplary image generation system including the spinning display and blur screen shown in FIG. 2A along perspective lines 2B-2B in FIG. 2A, according to one implementation.

It is further noted that, as shown by FIG. 2A, as well as by FIGS. 2B and 2C described below, height 108/208 of vertical edge 171/271 of blur screen 170/270 may determine the height of image generation system 100/200. That is to say, in some implementations, height 108/208 of vertical edge 171/271 of blur screen 170/270 equals the height of image generation system 100/200. However, different implementations may have different heights 108/208. In general, height 108/208 is at least as great as the height of display surface 140/240. In implementations in which image generation system 100/200 is viewed from above by observer 166 at an approximately thirty degree to forty five degree angle relative to horizontal Y axis 162/262, height 108/208 is typically greater than the height of display surface 140/240.

FIG. 2B shows a side view of exemplary image generation system 100/200 along perspective lines 2B-2B in FIG.

2A, according to one implementation. It is noted that, like FIG. 2A, the perspective depicted in FIG. 2B is shown as though seen through blur screen 270. It is further noted that any features in FIG. 2B identified by reference numbers identical to those shown in FIG. 2A correspond respectively to those previously identified features and share their respective characteristics. In addition to the features described above by reference to FIG. 2A, FIG. 2B shows axis of rotation 228 of rotor 106/206, display 102/202, and blur screen 170/270, as well as horizontal X axis 268 normal to display surface 140/240 and perpendicular to horizontal Y axis 162/262 in FIGS. 1 and 2A.

As shown in FIG. 2B, vertical edge 171/271 of blur screen 170/270 is substantially parallel to axis of rotation 228. As further shown in FIG. 2B, display surface 140/240 of display 102/202 may be situated on axis of rotation 228 of rotor 106/206, display 102/202, and blur screen 170/270. For example, in some implementations, display surface 140/240 may be precisely aligned so as to be on axis of rotation 228 and so as to be centered on axis of rotation 228.

Figure 2C:
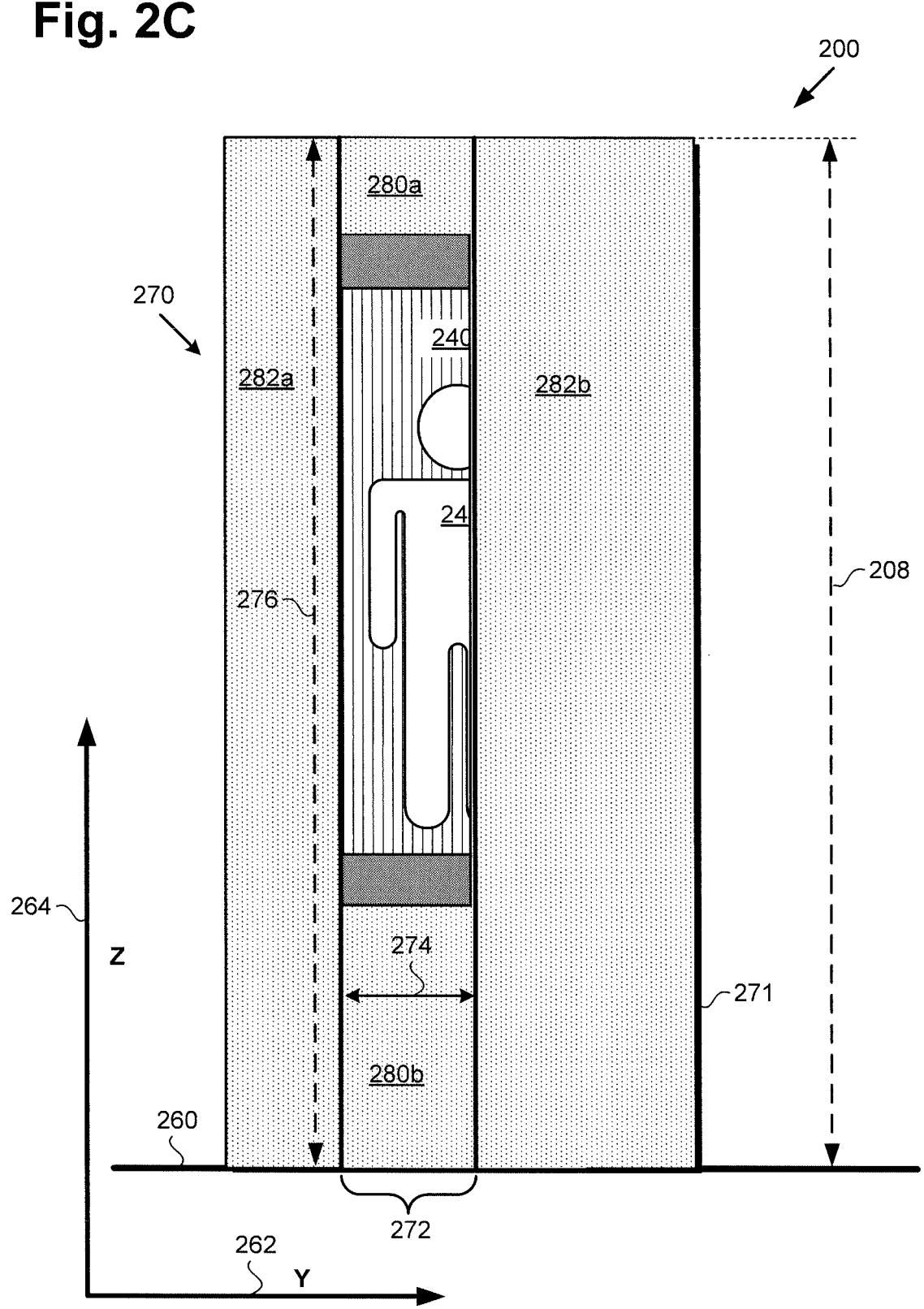
FIG. 2C shows a freeze frame front view of the exemplary image generation system including the spinning display and blur screen shown in FIGS. 2A and 2B at a particular point in their rotation, according to one implementation.
Figure 2D:
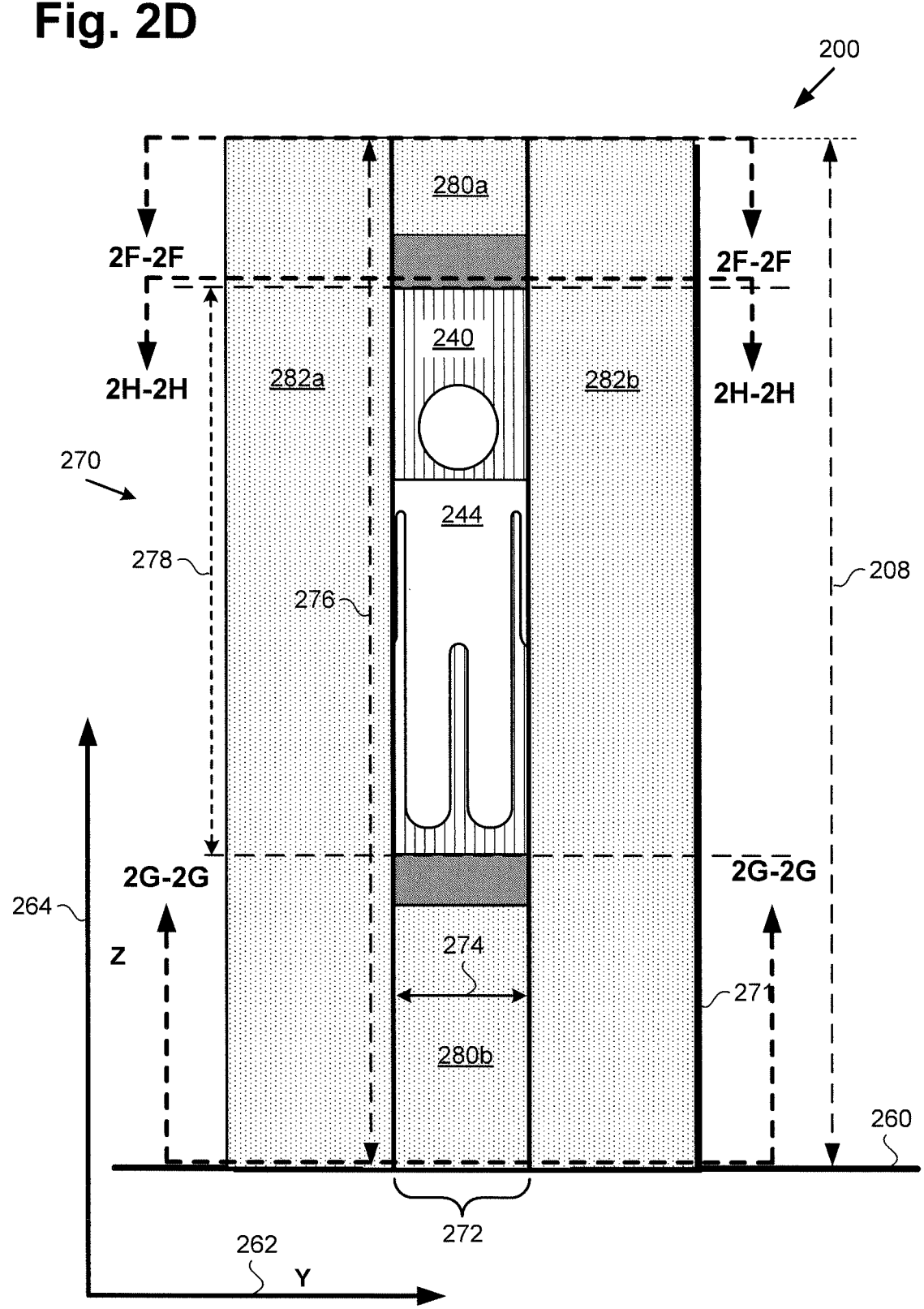
FIG. 2D shows a freeze frame front view of the exemplary image generation system including the spinning display and blur screen shown in FIGS. 2A, 2B, and 2C at a later point in their rotation than that shown in FIG. 2C, according to one implementation.
Figure 2E:
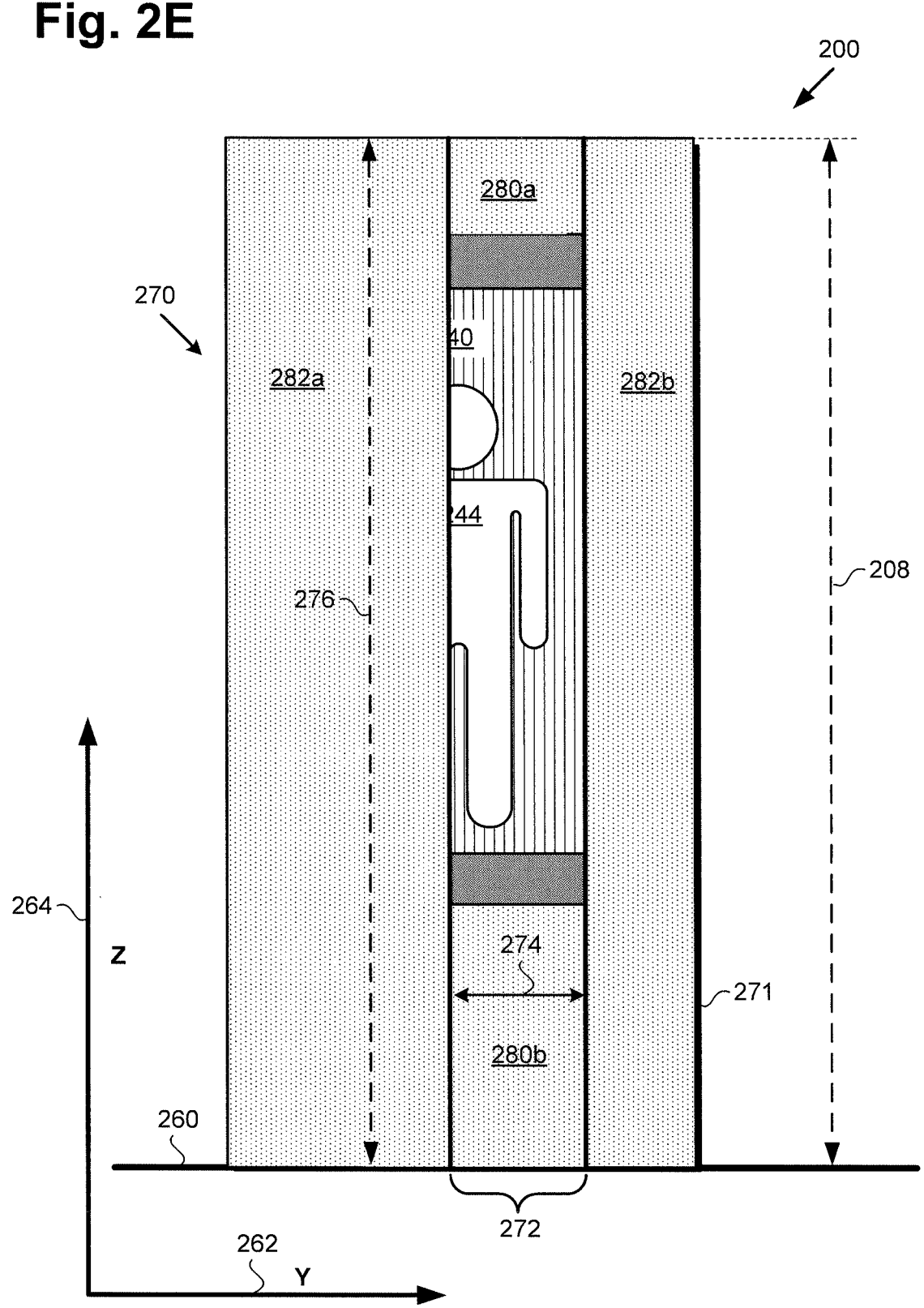
FIG. 2E shows a freeze frame front view of the exemplary image generation system including the spinning display and blur screen shown in FIGS. 2A, 2B, 2C, and 2D at a later point in their rotation than that shown in FIG. 2D, according to one implementation.

FIGS. 2C, 2D, and 2E show exemplary freeze frame front views of image generation system 100/200 at successive points in the rotation of spinning display 102/202 and blur screen 170/270. That is to say, FIG. 2C shows a freeze frame front view of image generation system 100/200 at a particular point in the rotation of display 102/202 and blur screen 170/270, FIG. 2D shows a freeze frame front view of image generation system 100/200 at a later point in that rotation, and FIG. 2E shows a freeze frame front view of image generation system 100/200 at an even later point in that rotation.

It is noted that any features in FIGS. 2C, 2D, and 2E identified by reference numbers identical to those shown in FIG. 2A or 2B correspond respectively to those previously identified features and share their respective characteristics. In addition to vertical edge 171/271 of blur screen 170/270 that is substantially parallel to axis of rotation 228, FIGS. 2C, 2D, and 2E further show horizontal gap 272 of blur screen 170/270, having width 274 substantially perpendicular to vertical edge 171/271, and having length 276 perpendicular to width 274. In addition, FIGS. 2C, 2D, and 2E show first light emission barrier 282a, second light emission barrier 282b, top blur guard 280a, bottom blur guard 280b. In addition, FIG. 2D shows a side view of cross-sectional segment 278 of image generation system 100/200 that is shown in greater detail and described below by reference to FIG. 2H.

Horizontal gap 272 having width 274 corresponds in general to horizontal gap 172 having width 174, in FIG. 1. That is to say, horizontal gap 272 and width 274 may share any of the characteristics attributed to respective horizontal gap 172 and width 174 by the present disclosure, and vice versa. Thus, like horizontal gap 272, horizontal gap 172 has length 276 perpendicular to width 174/274. Moreover, and as shown by FIGS. 2C, 2D, and 2E in some implementations, length 276 of horizontal gap 172/272 is equal to height 108/208 of vertical edge 171/271 of blur screen 170/270.

According to the exemplary implementation shown in FIGS. 2C, 2D, and 2E, in some implementations, top blur guard 280a may obscure endcap 126/226 and rotor 106/206 from the view of observer 166, while bottom blur guard 280b obscures base 110/210 from the view of observer 166. However, and as shown in FIG. 2C, 2D graphic 244 rendered on display surface 140/240 is visible to observer 166 through horizontal gap 172/272.

Regarding 2D graphic 244, as shown by the freeze frame front views provided in FIGS. 2C, 2D, and 2E, 2D graphic 244 is cropped by opaque first and second light emission barriers 282a and 282b when image generation system 100/200 is viewed statically. By contrast, and as shown in FIG. 2A, rotation of display 102/202 and blur screen 170/270 result in horizontal gap 172/272 functioning like a collimated raster scan across the eyes of observer 166, in FIG. 1. Thus, the cumulative cropped images of 2D graphic 244 shown by FIGS. 2C, 2D, and 2E scan on the retina of observer 166 to make to make combined image 148 corresponding to 2D graphic 244 in FIG. 2C when display 102/202 and blur screen 170/270 spin.

Spinning of display 102/202 and blur screen 170/270 by rotor 106/206 and motor 112/212 causes image 148, corresponding to 2D graphic 244, to appear to observer 166 as an image having substantially no perceptible blur. That is to say, because horizontal gap 172/272 sweeps horizontally across display surface 140/240, the image 148 appearing to observer 166 is the whole display image essentially blur free (i.e., not just what is visible as cropped 2D graphic 244 in each of FIGS. 2C, 2D, and 2E, but instead the summation of all angles viewed through horizontal gap 172/272 as it sweeps horizontally across display surface 140/240).

It is noted that in implementations in which blur screen 170/270 substantially surrounds display 102/202, as shown in FIG. 2B, spinning of display 102/202 and blur screen 170/270 cause image 148 to appear as a floating image in a dark cylindrical volume produced by the spinning of blur screen 170/270. In other words each light emitting pixel of display surface 140/240 will be visible within what appears to be a dark opaque cylinder (yet image 148 appears in the center).

Figure 2F:
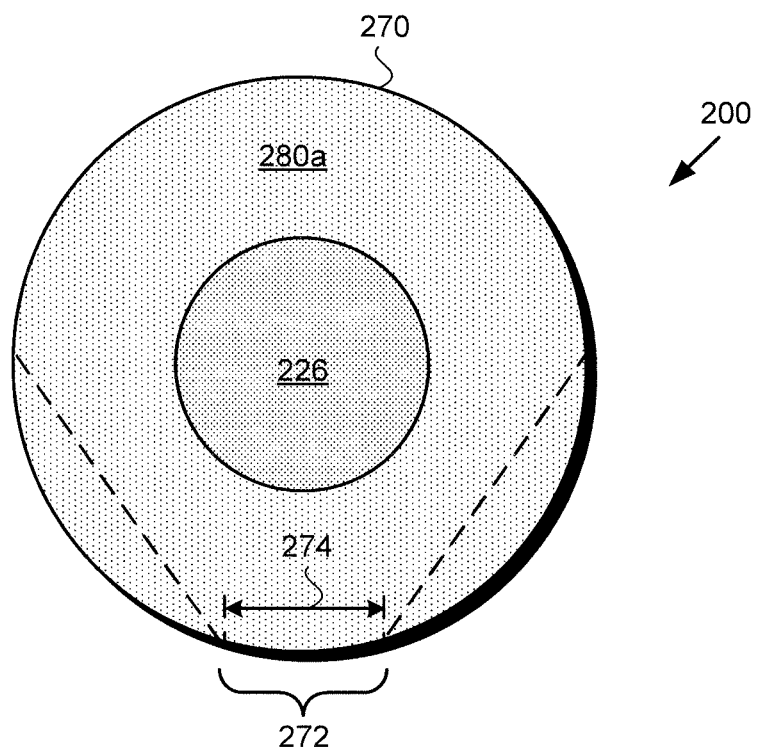
FIG. 2F shows a top view of the exemplary image generation system including the spinning display and blur screen shown in FIGS. 2A, 2B, 2C, 2D, and 2E along perspective lines 2F-2F in FIG. 2D, according to one implementation.

FIG. 2F shows a top view of exemplary image generation system 100/200 along perspective lines 2F-2F in FIG. 2D, according to one implementation. It is noted that any features in FIG. 2F identified by reference numbers identical to those shown in FIG. 2A, 2B, 2C, 2D, or 2E correspond respectively to those previously identified features and share their respective characteristics. It is further noted that although not visible from the perspective shown by FIG. 2F, horizontal gap 172/272 having width 174/274 and situated below top blur guard 280a is conceptually represented by dashed lines in FIG. 2F.

Referring to FIGS. 2D and 2F in combination, according to the present exemplary implementation, top blur guard 280a of blur screen 170/270, extends from the top of vertical edge 171/271 of blur screen 170/270 at height 108/208 above surface 260 to below endcap 126/226 so as to completely obscure display surface 140/240 from above the viewing window provided by horizontal gap 172/272 of blur screen 170/270. In some implementations, as shown by FIG. 2F, blur screen 170/270 may be cylindrical in the direction of vertical edge 171/271. In some of those implementations, top blur guard 280a may have a substantially linear negative slope from the top of vertical edge 171/271 to the terminus of top blur guard 280a at or above display 102/202 and below endcap 126/226. However, in other cylindrical implementations of blur screen 170/270, top blur guard 280a may assume a parabolic or otherwise curved shape between the top of vertical edge 171/271 and the terminus of top blur guard 280a at or above display 102/202 and below endcap 126/226.

Figure 2G:
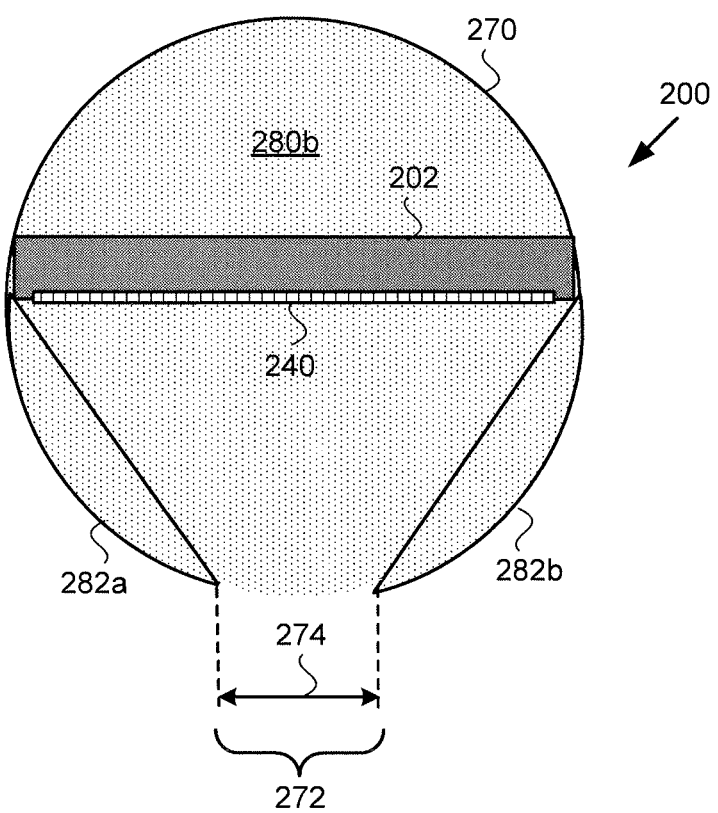
FIG. 2G shows a cross-sectional view of the exemplary image generation system including the spinning display and blur screen shown in FIGS. 2A, 2B, 2C, 2D, and 2E along perspective lines 2G-2G in FIG. 2D, according to one implementation.

FIG. 2G shows a cross-sectional view of exemplary image generation system 100/200 along perspective lines 2G-2G in FIG. 2D, according to one implementation. It is noted that any features in FIG. 2G identified by reference numbers identical to those shown in FIG. 2A, 2B, 2C, 2D, 2E, or 2F correspond respectively to those previously identified features and share their respective characteristics. Referring to FIGS. 2D and 2G in combination, according to the present exemplary implementation, bottom blur guard 280b of blur screen 170/270, extends from the bottom of display 102/202 so as to completely obscure display surface 140/240 from below the viewing window provided by horizontal gap 172/272 of blur screen 170/270.

Figure 2H:
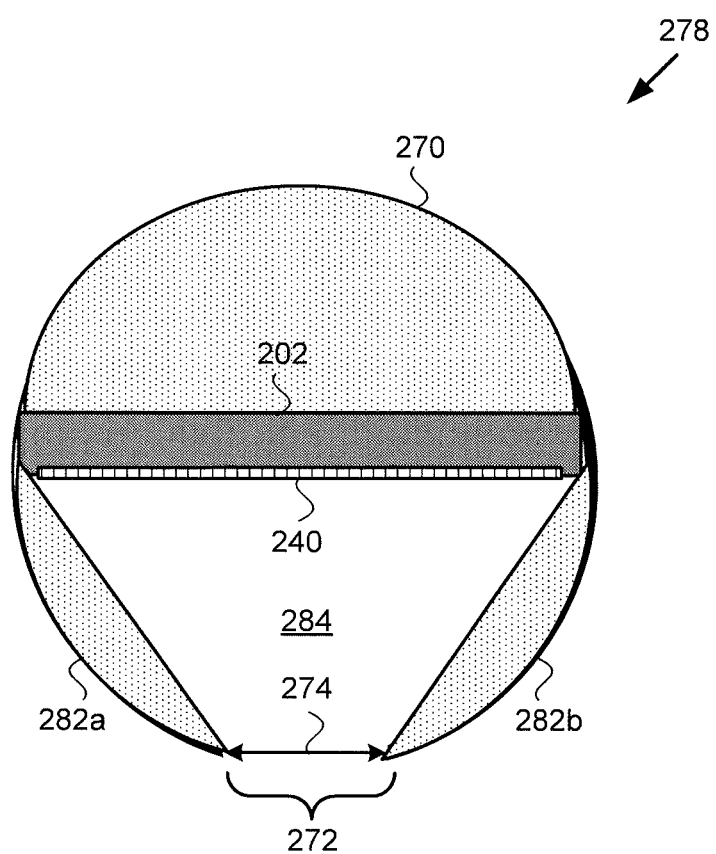
FIG. 2H shows a top view into an exemplary cross-sectional segment of the image generation system including the spinning display and blur screen shown in FIGS. 2A, 2B, 2C, 2D, and 2E along perspective lines 2H-2H in FIG. 2D, according to one implementation.

FIG. 2H shows a top view into exemplary cross-sectional segment 278 of image generation system 100/200 along perspective lines 2H-2H in FIG. 2D, according to one implementation. It is noted that any features in FIG. 2H identified by reference numbers identical to those shown in FIG. 2A, 2B, 2C, 2D, 2E, 2F, or 2G correspond respectively to those previously identified features and share their respective characteristics.

As shown by FIGS. 2F, 2G, and 2H, in some implementations, blur screen 170/270 may be secured to display 102/202 and may take the form of a cylindrical housing containing display 102/202. As shown in FIGS. 2G and 2H, width 174/274 of horizontal gap 172/272 separates first light emission barrier 282a from second light emission barrier 282b. In addition, and as shown in FIG. 2H, blur screen 170/270 may form substantially triangular viewing cavity 284 between display surface 140/240 and horizontal gap 172/272.

Blur screen 170/270 may be formed of any suitable opaque material having sufficient rigidity to prevent blur screen 170/270 from deforming at spin rates in a range, but not limited to, from approximately nine hundred revolutions per minute to approximately three thousand six hundred revolutions per minute (900 rpm-3600 rpm). For example, blur screen 170/270 including first light emission barrier 282a, second light emission barrier 282b, top blur guard 280a, and bottom blur guard 280b may be formed of injection molded plastics, formed rigid foam shaped light weight metals, or other materials. Furthermore, and as also shown by FIGS. 2G and 2H, in some implementations, first light emission barrier 282a and second light emission barrier 282b may each be implemented as a volumetric segment having at least one curved surface.

Figure 3A:
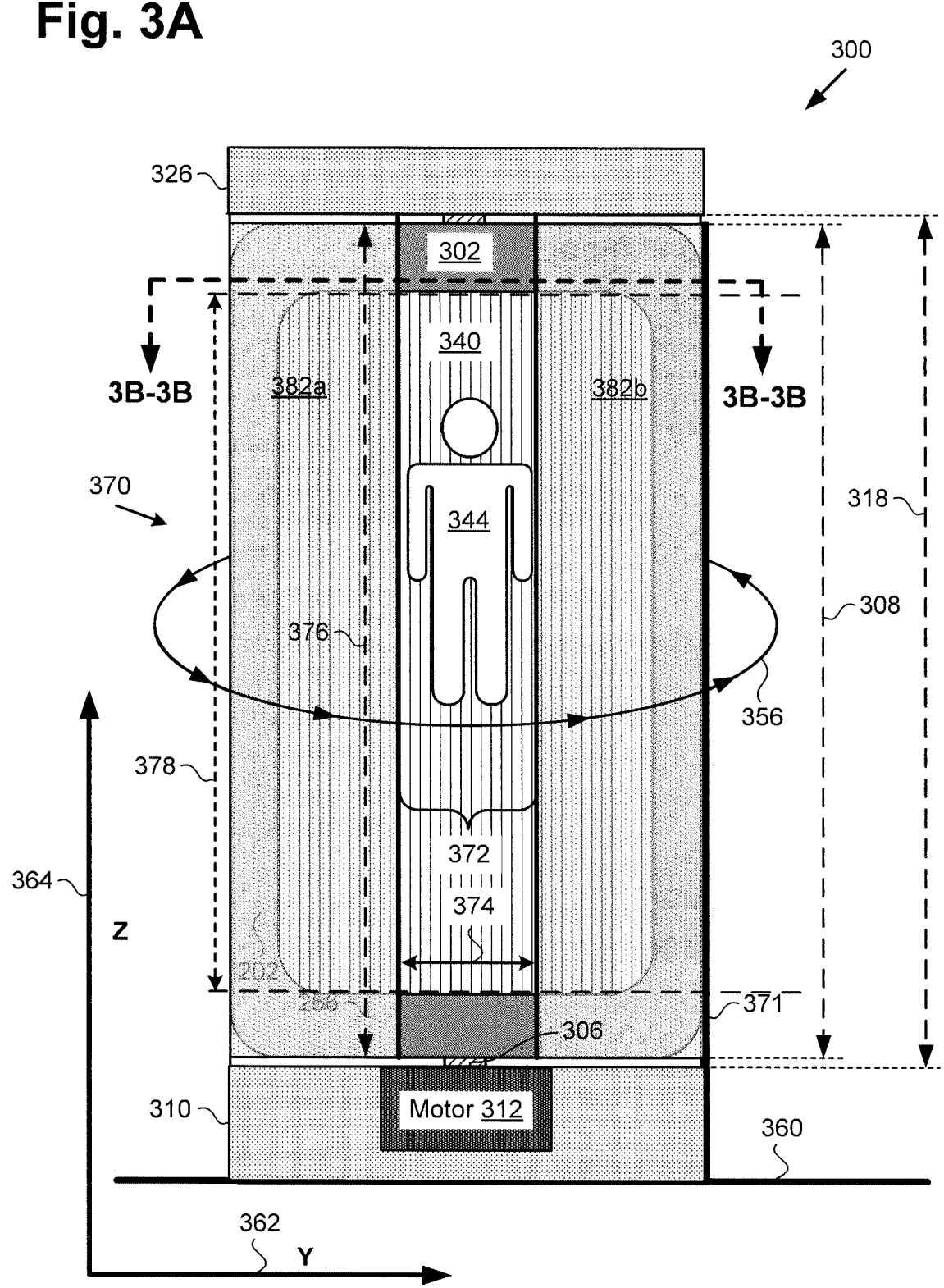
FIG. 3A shows a front view of an exemplary image generation system including a spinning display and blur screen corresponding in general to the system shown in FIG. 1, according to another implementation.

FIG. 3A shows a front view of exemplary image generation system 300 including spinning display 302 and blur screen 370 including first light emission barrier 382a and second light emission barrier 382b, according to another implementation. As shown in FIG. 3A, in addition to display 302 and blur screen 370, image generation system 300 includes base 310 and endcap 326. Base 310 is shown to include motor 312 and to be situated on surface 360, which may be a floor or any other substantially horizontal surface. In addition, according to the exemplary implementation shown in FIG. 3A, image generation system 300 includes rotor 306 secured to display 302.

Display 302 includes display surface 340 on which 2D graphic 344 is rendered. In addition, FIG. 3A shows vertical edge 371 of blur screen 370 having height 308, horizontal gap 372 having width 374 substantially perpendicular to vertical edge 371, and distance 318 between base 310 and endcap 326. It is noted that vertical edge 371 of blur screen 370 is substantially parallel to an axis of rotation of rotor 306, display 302, and blur screen 370 corresponding to axis of rotation 228, in FIG. 2B. Also shown in FIG. 3A are horizontal Y axis 362 substantially parallel to surface 360, vertical Z axis 364 substantially perpendicular to surface 360 and substantially parallel to vertical edge 371 of blur screen 370, side view of cross-sectional segment 378 of image generation system 300, and spin direction 356 of rotor 306, display 302, and blur screen 370.

Image generation system 300 including cross-sectional segment 378 corresponds in general to image generation system 100/200 including cross-sectional segment 278, in FIGS. 1, 2A, 2B, 2C, 2D, and 2E. As a result, image generation system 300 may share any of the characteristics attributed to image generation system 100/200 by the present disclosure, and vice versa. In addition, endcap 326, rotor 306, and base 310 including motor 312, correspond respectively in general to endcap 126/226, rotor 106/206, and base 110/210 including motor 112/212, in FIGS. 1, 2A, 2B, 2C, 2D, and 2E. Thus, endcap 326, rotor 306, base 310, and motor 312, may share any of the characteristics attributed to respective endcap 126/226, rotor 106/206, base 110/210, and motor 112/212, by the present disclosure, and vice versa. That is to say, although not explicitly shown in FIG. 3A, base 310 includes features corresponding respectively to motor controller circuit 114 and MCU 116.

Moreover, display 302 including display surface 340 corresponds in general to display 102/202 including display surface 140/240, in FIGS. 1, 2A, 2B, 2C, 2D, and 2E. Thus, display 302 and display surface 340 may share any of the characteristics attributed to respective display 102/202 and display surface 140/240 by the present disclosure, and vice versa. That is to say, although not explicitly identified in FIG. 3A, display 302 may include features corresponding respectively to computing platform 120 including ASIC 130 having CPU 132, GPU 134, and DSP 136, and further including system memory 122 storing software code 124. Moreover, like display surface 140/240, display surface 340 is on an axis of rotation of rotor 306, display 302, and blur screen 370 corresponding to axis of rotation 228, in FIG. 2B.

It is noted that blur screen 370 including horizontal gap 372 having width 374, in FIG. 3A, corresponds in general to blur screen 170/270 including horizontal gap 172/272 having width 174/274, in FIGS. 1 and 2C, 2D, and 2E. As a result, blur screen 370, horizontal gap 372, and width 374 may share any of the characteristics attributed to respective blur screen 170/270, horizontal gap 172/272, and width 174/274 by the present disclosure, and vice versa. It is further noted that spin direction 356 of rotor 306, display 302, and blur screen 370 corresponds to spin direction 256 in FIG. 2A.

In contrast to the implementation shown by FIGS. 2A, 2B, 2C, 2D, and 2E, however, according to the exemplary implementation shown in FIG. 3A, height 308 of vertical edge 371 of blur screen 370 is less than distance 318 between base 310 and endcap 326. Nevertheless, like the implementation shown by FIGS. 2A, 2B, 2C, 2D, and 2E, horizontal gap 372 has length 376 perpendicular to width 374 and equal to height 308 of vertical edge 371. Moreover, width 374 of horizontal gap 372 is substantially perpendicular to vertical edge 371 of blur screen 370.

Figure 3B:
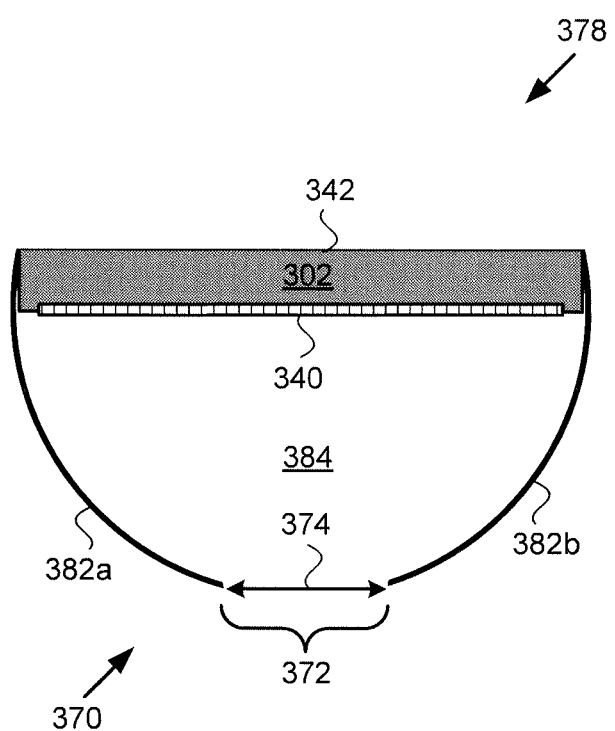
FIG. 3B shows a top view into an exemplary cross-sectional segment of the image generation system including the spinning display and blur screen shown in FIG. 3A along perspective lines 3B-3B in FIG. 3A, according to one implementation.

FIG. 3B shows a top view into exemplary cross-sectional segment 378 of image generation system 100/300 along perspective lines 3B-3B in FIG. 3A, according to one implementation. It is noted that any features in FIG. 3B identified by reference numbers identical to those shown in FIG. 3A correspond respectively to those previously identified features and share their respective characteristics. In addition to those features, FIG. 3B shows backside 342 of display 102/302, opposite display surface 140/340, and viewing cavity 384 of blur screen 170/370.

It is noted that the exemplary implementation shown by FIG. 3B differs from those shown by FIGS. 2A, 2B, 2C, 2D, 2E, 2F, 2G, and 2H in that unlike blur screen 270, blur screen 370 does not extend around backside 342 of display 102/302 or otherwise obscure backside 342 of display 102/302. As shown in FIG. 3B, in some implementations, first and second light emission barriers 382a and 382b may each be a semi-circular segment. As further shown in FIG. 3B, in those implementations, viewing cavity 384 may be half-cylindrical between display surface 140/340 and horizontal gap 172/372.

Like blur screen 170/270, blur screen 170/370 may be formed of any suitable opaque material having sufficient rigidity to prevent blur screen 170/370 from deforming at spin rates in a range, but not limited to, from approximately nine hundred revolutions per minute to approximately three thousand six hundred revolutions per minute (900 rpm-3600 rpm). For example, blur screen 170/370 including first light emission barrier 382a and second light emission barrier 382b may be formed of injection molded plastics, formed rigid foam, shaped light weight metals, or other materials.

Figure 4A:
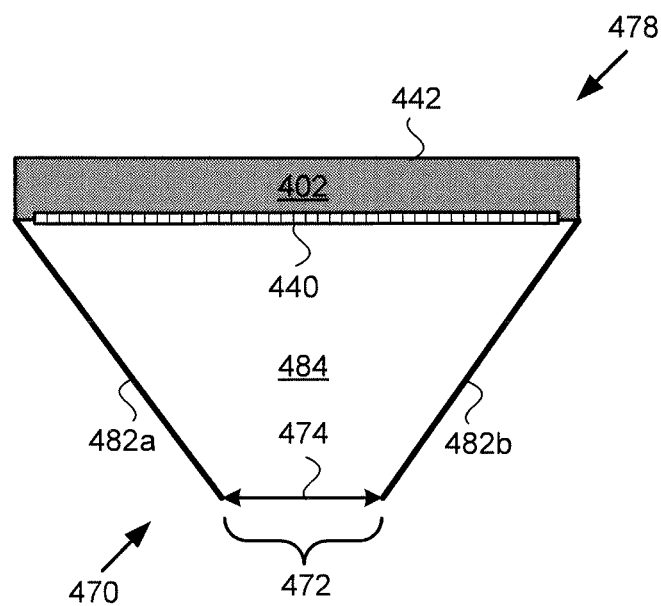
FIG. 4A shows a top view into an exemplary cross-sectional segment of an image generation system including a spinning display and blur screen that corresponds in general to the cross-sectional segment shown in FIGS. 2F and 3B, according to another implementation.
Figure 4B:
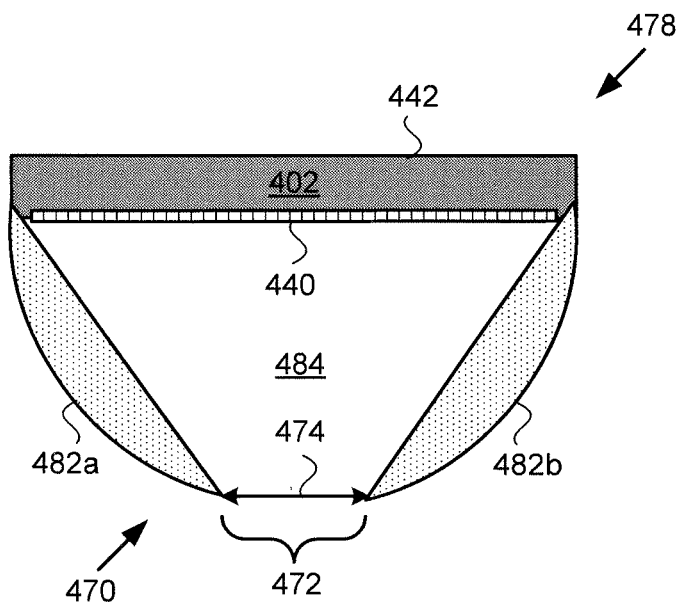
FIG. 4B shows a top view into an exemplary cross-sectional segment of an image generation system including a spinning display and blur screen that corresponds in general to the cross-sectional segment shown in FIGS. 2F and 3B, according to another implementation.

FIGS. 4A and 4B show top views into exemplary cross-sectional segments 478 of an image generation system that correspond in general to cross-sectional segment 278/378 shown in FIGS. 2H and 3B, according to other implementations. Each of FIGS. 4A and 4B show blur screen 470 including first light emission barrier 482a, second light emission barrier 482b, and horizontal gap 472 having width 474 separating first light emission barrier 482a from second light emission barrier 482b. Also shown in FIGS. 4A and 4B are display 402 including display surface 440 and backside 442 opposite display surface 440, and viewing cavity 484 formed by blur screen 470 between display surface 440 and horizontal gap 472.

Blur screen 470 including first light emission barrier 482a, second light emission barrier 482b, and horizontal gap 472 having width 474 corresponds in general to blur screen 170/270/370 including first light emission barrier 282a/382a, second light emission barrier 282b/382b, and horizontal gap 172/272/372 having width 174/274/374 in FIGS. 1, 2A, 2B, 2C, 2D, 2E, 2F, 2G, 2H, 3A, and 3B. That is to say, blur screen 470, first light emission barrier 482a, second light emission barrier 482b, horizontal gap 472, and width 474 may share any of the characteristics attributed to respective blur screen 170/270/370, first light emission barrier 282a/382a, second light emission barrier 282b/382b, horizontal gap 172/272/372, and width 174/274/374 by the present disclosure, and vice versa.

In addition, display 402 having display surface 440 and backside 442, and viewing cavity 484 correspond respectively in general to display 102/202/302 having display surface 140/240/340, and viewing cavity 284/384 in FIGS. 1, 2A, 2B, 2C, 2D, 2E, 2H, 3A, and 3B. Thus, display 402, display surface 440, and viewing cavity 484 may share any of the characteristics attributed to respective display 102/202/303, display surface 140/240/340, and viewing cavity 284/384 by the present disclosure, and vice versa.

Like blur screen 370, in FIG. 3B, the exemplary implementations shown by FIGS. 4A and 4B differ from those shown by FIGS. 2A, 2B, 2C, 2D, 2E, 2F, 2G, and 2H in that unlike blur screen 270, blur screen 470 does not extend around backside 442 of display 402 or otherwise obscure backside 442 of display 402. As shown in FIG. 4A, in some implementations, first and second light emission barriers 482a and 482b may each be planar surfaces. As also shown in FIG. 4A, in those implementations, viewing cavity 484 may be substantially triangular between display surface 440 and horizontal gap 472.

According to the exemplary implementation shown in FIG. 4B, first and second light emission barriers 482a and 482b may each be implemented as a volumetric segment having at least one curved surface. In those implementations, viewing cavity 484 may also be substantially triangular between display surface 440 and horizontal gap 472. It is noted that in further contrast to implementations in which blur screen 170/270 substantially surrounds display 102/202, and in which image 148 appears as a floating image in a dark cylindrical volume produced by the spinning of blur screen 170/270, the blur screen 170/370/470 becomes substantially transparent when spun. That is it to say each light emitting pixel of display surface 140/340 will be visible but non-light or off pixels will become transparent when spinning, thereby causing image 148 to appear to observer 166 as a transparent floating image.

Referring to FIGS. 1, 2A, 2B, 2C, 2D, 2E, 3A, 3B, 4A, and 4B in combination, display surface 140/240/340/440 may be controlled by CPU 132 and/or GPU 134 of ASIC 130, while rotor 106/206/306 coupled to display 102/202/302/402 is controlled by CPU 132 of ASIC 130. CPU 132 of ASIC 130 is configured to execute software code 124 to render 2D graphic 244/344 on display surface 140/240/340/440.

CPU 132 is further configured to execute software code 124 to utilize motor 112/212/312 to spin rotor 106/206/306, display 102/202/302/402, and blur screen 170/270/370/470 about axis of rotation 228 at a predetermined spin rate to generate image 148 corresponding to 2D graphic 244/344. As a result of the image generation performed by spinning of display 102/202/302/402 and blur screen 170/270/370/470, image 148 may appear to be floating in space, and may appear through horizontal gap 172/272/372/472 to be a three-dimensional (3D) floating image corresponding to 2D graphic 244/344 rendered on display surface 140/240/340/440.

In some implementations, display surface 140/240/340/440 may be a liquid-crystal display (LCD) screen, or an organic light-emitting diode (OLED) display screen, for example. Moreover, in some implementations, display surface 140/240/340/440 may be part of a mobile communication device serving as computing platform 120, the mobile communication device being integrated with display 102/202/302/402, and being configured to spin with rotor 106/206/306 and display 102/202/302/402 at the predetermined spin rate. For example, display surface 140/240/340/440 may be part of a smartphone or a tablet computer providing computing platform 120.

It is noted that CPU 132 may execute software code 124 to control motor 112/212/312 in order to spin rotor 106/206/306, display 102/202/302/402, and blur screen 170/270/370/470 about axis of rotation 228 at a varying spin rate, or at a substantially constant predetermined spin rate. It is also noted that spin direction 256/356 may be in either a counter clockwise direction with respect to the plane of horizontal X axis 268 and horizontal Y axis 162/262/362, as shown in FIGS. 2A, 2C, and 3A, or in a clockwise direction with respect to that plane.

In some implementations, CPU 132 may execute software code 124 to use GPU 134 to change 2D graphic 244/344 as rotor 106/206/306, display 102/202/302/402, and blur screen 170/270/370/470 spin, so as to generate multiple perspectives of image 148 that are appropriate respectively to the locations of each observer of image 148. For example, observer 166 located so as to face a front side of image 148 and stationary at that location might consistently view image 148 from a frontal perspective. By contrast, another observer located so as to face a backside of image 148, i.e., 180° apart from the perspective of observer 166, and stationary at that location might consistently view image 148 as if from the rear.

Figure 5:
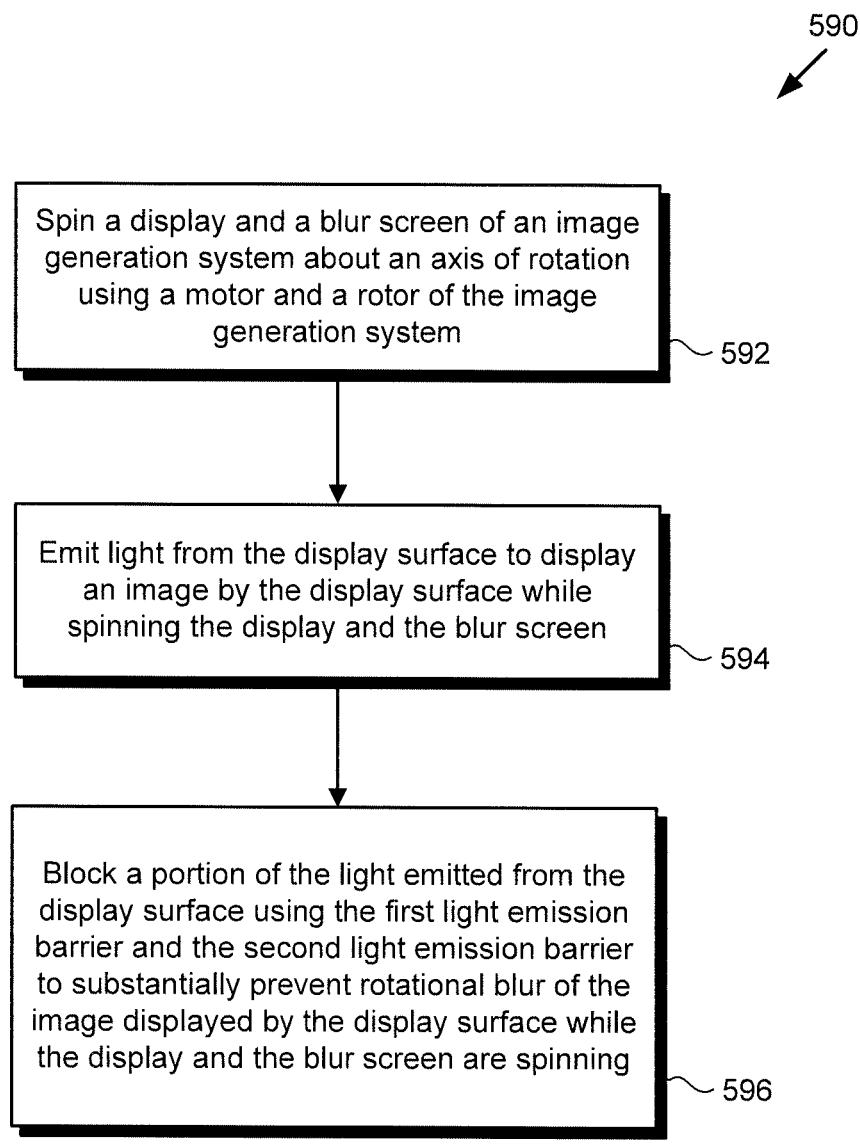
FIG. 5 shows a flowchart outlining an exemplary method for generating an image using a spinning display and blur screen, according to one implementation.

The functionality of image generation system 100/200/300 including display 102/202/302/402 and blur screen 170/270/370/470 configured to spin will be further described by reference to FIG. 5. FIG. 5 shows flowchart 590 outlining an exemplary method for generating an image that is substantially free of rotational blur using a spinning display and blur screen, according to one implementation. With respect to the method described by FIG. 5, it is noted that certain details and features have been left out of flowchart 590 in order not to obscure the discussion of the inventive features in the present application.

Referring to FIG. 5 in combination with FIGS. 1, 2A, 2B, 2C, 2D, 2E, 2H, 3A, 3B, 4A, and 4B, flowchart 590 begins with spinning display 102/202/302/402 and blur screen 170/270/370/470 about axis of rotation 228 using motor 112/212/312 and rotor 106/206/306 (action 592). As noted above, spinning of display 102/202/302/402 and blur screen 170/270/370/470 about axis of rotation 228 may be performed using motor 112/212/312 and rotor 106/206/306 under the control of software code 124, executed by CPU 132 of ASIC 130, and using a predetermined spin rate or a variable spin rate. By way of example, CPU 132 may execute software code 124 to use motor 112/212/312 and rotor 106/206/306 to spin display 102/202/302/402 and blur screen 170/270/370/470 about axis of rotation 228 at spin rate in a range, but not limited to, from approximately nine hundred revolutions per minute to approximately three thousand six hundred revolutions per minute (900 rpm-3600 rpm).

Flowchart 590 continues with emitting light from display surface 140/240/340/440 to display image 148 by display surface 140/240/340/440 while spinning display 102/202/302/402 and blur screen 170/270/370/470 (action 594). Emission of light from display surface 140/240/340/440 to display image 148 may be controlled by software code 124, executed by CPU 132 of ASIC 130, and may include use of GPU 134. As noted above, as a result of the image generation performed by spinning of display 102/202/302/402, image 148 may be viewed through horizontal gap 172/272/372/472 of blur screen 170/270/370/470, and may appear to be a 3D image corresponding to 2D graphic 244/344 rendered on display surface 140/240/340/440. Furthermore, image 148 may appear to be a 3D image floating in space.

Flowchart 590 can conclude with blocking a portion of the light emitted from display surface 140/240/340/440 using first light emission barrier 282a/382a/482a and the second light emission barrier 282b/382b/482b to prevent rotational blur of image 148 displayed by display surface 140/240/340/440 while display 102/202/302/402 and blur screen 170/270/370/470 are spinning (action 596).

As noted above, image 148 is visible to observer 166 through horizontal gap 172/272/372/472 having width 174/274/374/474. It is noted that 2D graphic 244/344 to which image 148 corresponds may be as large as display surface 140/240/340/440 and still be visible in its entirety to observer 166 because observer 166 views the cumulative effect of horizontal gap 172/272/372/472 sweeping across display surface 140/240/340/440.

Width 174/274/374/474 of horizontal gap 172/272/372/472 determines the resolution with which image 148 can be displayed. In general, the narrower width 174/274/374/474 of sweeping horizontal gap 172/272/372/472 is, the crisper or sharper resultant floating image 148 will be. It is noted that although narrowing width 174/274/374/474 of horizontal gap 172/272/372/472 causes image 148 to appear less bright, i.e., to appear dimmer, because more of the light emitted from display surface 140/240/340/440 is blocked by first light emission barrier 282a/382a/482a and second light emission barrier 282b/382b/482b, that attenuation in brightness of image 148 is advantageously less than that produced by other approaches to preventing rotational blur.

In implementations in which resolution of image 148 is of high importance, it may be advantageous or desirable to compensate for the dimming effect of narrow horizontal gap 172/272/372/472 by increasing the brightness with which 2D graphic 244/344 is rendered on display surface 140/240/340/440. However, in other implementations in which resolution of image 148 is less critical, wider horizontal gap 172/272/372/472 resulting in less light blocking by first light emission barrier 282a/382a/482a and second light emission barrier 282b/382b/482b may be preferred.

As a specific exemplary use case, in implementations in which observer 166 views image 148 from a distance of between approximately one half and approximately three meters (0.5 m-3.0 m), for instance, width 174/274/374/474 of horizontal gap 172/272/372/472 may be less than ten millimeters (<10 mm), such as in a range from approximately six millimeters to approximately eight millimeters (6.0 mm-8.0 mm), for example.

Thus, the present application discloses systems and methods for generating an image that is substantially free of rotational blur using a spinning display and blur screen. By rendering a 2D graphic on a display surface of a display and spinning the display using a motor and a rotor, the systems and methods disclosed by the present application enable the generation of an apparently 3D floating image corresponding to the 2D graphic. Moreover, by utilizing a blur screen spinning with the display and including first and second light emission barriers blocking a portion of the light emitted from the display surface, the present solution advantageously enables generation of the 3D image having no perceptible rotational blur.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image generation system comprising:
a rotor and a base including a motor for spinning the rotor about an axis of rotation;
a display secured to the rotor, wherein the display includes a display surface;
a blur screen secured to the display, the blur screen having a vertical edge substantially parallel to the axis of rotation and including a first light emission barrier, a second light emission barrier, and a horizontal gap having a width substantially perpendicular to the vertical edge separating the first light emission barrier from the second light emission barrier;
wherein the first light emission barrier and the second light emission barrier are configured to substantially prevent rotational blur of an image when displayed by the display surface while the display and the blur screen are spun by the motor and the rotor, and wherein the blur screen forms a substantially triangular viewing cavity or a substantially half-cylindrical viewing cavity between the display surface and the horizontal gap.

2. The image generation system of claim 1, wherein the display surface is on the axis of rotation.

3. The image generation system of claim 1, wherein the blur screen comprises a cylindrical housing containing the display.

4. The image generation system of claim 1, wherein the horizontal gap has a length perpendicular to the width and equal to a height of the vertical edge of the blur screen.

5. The image generation system of claim 1, wherein a height of the vertical edge of the blur screen is less than a distance between the base and an endcap of the image generation system opposite the base.

6. The image generation system of claim 1, wherein a height of the vertical edge of the blur screen equals a height of the image generation system.

7. The image generation system of claim 1, wherein the first light emission barrier and the second light emission barrier comprise plastic, rigid foam, or metal.

8. The image generation system of claim 1, wherein the display is configured to display the image as a two-dimensional (2D) graphic on the display surface, and wherein when the motor and the rotor spin the display and the blur screen, the image rendered as the 2D graphic appears as a three-dimensional (3D) floating image.

9. The image generation system of claim 1, wherein the display surface is part of a mobile communication device configured to spin with the display.

10. A method for use by an image generation system having a rotor, a base including a motor for spinning the rotor about an axis of rotation, a display secured to the rotor, and a blur screen secured to the display, the blur screen having a vertical edge substantially parallel to the axis of rotation and including a first light emission barrier, a second light emission barrier, and a horizontal gap having a width substantially perpendicular to the vertical edge separating the first light emission barrier from the second light emission barrier, the method comprising:

spinning the display and the blur screen, using the motor and the rotor, about the axis of rotation;

emitting light from the display surface to display an image while spinning the display and the blur screen; and blocking a portion of the light emitted from the display surface using the first light emission barrier and the second light emission barrier to prevent rotational blur of the image displayed by the display surface while the display and the blur screen are spinning, wherein the blur screen forms a substantially triangular viewing cavity or a substantially half-cylindrical viewing cavity between the display surface and the horizontal gap.

11. The method of claim 10, wherein the display surface is on the axis of rotation.

12. The method of claim 10, wherein the blur screen comprises a cylindrical housing containing the display.

13. The method of claim 10, wherein the horizontal gap has a length perpendicular to the width and equal to a height of the vertical edge of the blur screen.

14. The method of claim 10, wherein a height of the vertical edge of the blur screen is less than a distance between the base and an endcap of the image generation system opposite the base.

15. The method of claim 10, wherein a height of the vertical edge of the blur screen equals a height of the image generation system.

16. The method of claim 10, wherein the first light emission barrier and the second light emission barrier comprise one of plastic, rigid foam, or metal.

17. The method of claim 10, wherein the image displayed by the display surface is rendered as a two-dimensional (2D) graphic on the display surface, and wherein spinning the display and the blur screen by the motor and the rotor causes the image rendered as the 2D graphic to appear as a three-dimensional (3D) floating image.

18. The method of claim 10, wherein the display surface is part of a mobile communication device configured to spin with the display.

* * * * *